(12) United States Patent
Zhang

(10) Patent No.: US 10,819,787 B2
(45) Date of Patent: Oct. 27, 2020

(54) REMOTE SYNCHRONIZATION METHOD, APPARATUS, AND SYSTEM

(71) Applicant: SZ DJI TECHNOLOGY CO., LTD., Shenzhen (CN)

(72) Inventor: Zhiyuan Zhang, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 26 days.

(21) Appl. No.: 16/217,524

(22) Filed: Dec. 12, 2018

(65) Prior Publication Data

US 2019/0116225 A1 Apr. 18, 2019

Related U.S. Application Data

(63) Continuation of application No. PCT/CN2016/086778, filed on Jun. 22, 2016.

(51) Int. Cl.
| | |
|---|---|
| *G06F 15/16* | (2006.01) |
| *H04L 29/08* | (2006.01) |
| *H04W 4/40* | (2018.01) |
| *G05D 1/00* | (2006.01) |
| *G05D 1/10* | (2006.01) |
| *B64C 39/02* | (2006.01) |

(52) U.S. Cl.
CPC ......... *H04L 67/1095* (2013.01); *G05D 1/005* (2013.01); *G05D 1/0016* (2013.01); *G05D 1/0022* (2013.01); *G05D 1/101* (2013.01); *H04L 67/025* (2013.01); *H04W 4/40* (2018.02); *B64C 39/024* (2013.01); *B64C 2201/146* (2013.01)

(58) Field of Classification Search
None
See application file for complete search history.

(56) References Cited

U.S. PATENT DOCUMENTS

| | | | |
|---|---|---|---|
| 6,708,212 B2* | 3/2004 | Porras | H04L 41/142 709/224 |
| 10,122,748 B1* | 11/2018 | Currie | G06F 16/955 |
| 2002/0095568 A1 | 7/2002 | Norris et al. | |
| 2010/0114633 A1* | 5/2010 | Sislak | G06Q 10/047 701/120 |
| 2012/0166016 A1* | 6/2012 | Bartley | G01S 5/0027 701/1 |

(Continued)

FOREIGN PATENT DOCUMENTS

| | | | |
|---|---|---|---|
| CN | 101738608 A | 6/2010 | |
| CN | 104570872 A | 4/2015 | |

(Continued)

OTHER PUBLICATIONS

Debra Baker, Security Target V 1.11, Aug. 18, 2005, V 1.11, pp. 1-95 (Year: 2005).*

(Continued)

*Primary Examiner* — Phuoc H Nguyen
(74) *Attorney, Agent, or Firm* — Anova Law Group, PLLC

(57) ABSTRACT

A remote synchronization method includes associating a listening environment with a listen object including status information of a first device, adding a listener to the listening environment that is configured to listen in the listen object, and notifying a second device in response to the listener detecting that the listen object has changed.

17 Claims, 10 Drawing Sheets

(56) References Cited

U.S. PATENT DOCUMENTS

| | | | | |
|---|---|---|---|---|
| 2013/0159548 A1* | 6/2013 | Vasseur | ................ | H04L 45/125 |
| | | | | 709/239 |
| 2015/0142211 A1 | 5/2015 | Shehata et al. | | |
| 2016/0039529 A1* | 2/2016 | Buchmueller | ......... | B64D 31/06 |
| | | | | 244/65 |
| 2016/0086391 A1* | 3/2016 | Ricci | ...................... | G07C 5/008 |
| | | | | 701/29.3 |
| 2018/0231972 A1* | 8/2018 | Woon | ..................... | G05D 1/104 |

FOREIGN PATENT DOCUMENTS

| | | |
|---|---|---|
| CN | 105045283 A | 11/2015 |
| CN | 204926552 U | 12/2015 |
| CN | 204968021 U | 1/2016 |

OTHER PUBLICATIONS

The World Intellectual Property Organization (WIPO) International Search Report and for PCT/CN2016/086778 dated Mar. 30, 2017 6 pages.

"IOS-KVO, KVC", bubuko.com, Apr. 23, 2016 http://www.bubuko.com/infodetail-1521291.html.

* cited by examiner

REMOTE SYNCHRONIZATION METHOD, APPARATUS, AND SYSTEM

CROSS-REFERENCE TO RELATED APPLICATION

This application is a continuation application of International Application No. PCT/CN2016/086778, filed on Jun. 22, 2016, the entire contents of which are incorporated herein by reference.

TECHNICAL FIELD

The present disclosure relates to the field of data synchronization and, more particularly, to a remote synchronization method, a remote synchronization apparatus, and a remote synchronization system.

BACKGROUND

For synchronizing data and statuses on a remote device to a local device and performing operations thereon, it is needed to consider validity of the data and synchronization mutual exclusion relationships between statuses. Usually, a large amount of synchronization code needs to be written, and once mistakes occur, it is difficult to locate a problem.

SUMMARY

In accordance with the disclosure, there is provided a remote synchronization method including associating a listening environment with a listen object including status information of a first device, adding a listener to the listening environment that is configured to listen in the listen object, and notifying a second device in response to the listener detecting that the listen object has changed.

Also in accordance with the disclosure, there is provided a remote synchronization apparatus including a processor and a memory storing instructions that, when executed by the processor, cause the processor to associate a listening environment with a listen object including status information of a first device, add a listener to the listening environment that is configured to listen in the listen object, and notify a second device in response to the listener detecting that the listen object has changed.

Also in accordance with the disclosure, there is provided a remote synchronization system including a first device, a second device, and a remote synchronization apparatus. The first device includes at least one of an unmanned aerial vehicle (UAV), a gimbal, or a camera. The second device includes at least one of a ground station, a remote controller, a cell phone, a tablet computer, a personal computer, or another UAV. The remote synchronization apparatus includes a processor and a memory storing instructions that, when executed by the processor, cause the processor to associate a listening environment with a listen object including status information of a first device, add a listener to the listening environment that is configured to listen in the listen object, and notify a second device in response to the listener detecting that the listen object has changed.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Exemplary embodiments will be described with reference to the accompanying drawings, in which the same numbers refer to the same or similar elements unless otherwise specified.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

Further, in the present disclosure, the disclosed embodiments and the features of the disclosed embodiments may be combined when there are no conflicts.

The present disclosure provides a key value synchronization method, an apparatus, and an unmanned aerial vehicle (UAV) system. Data and statuses on a remote device may be synchronized to a local device for display and operation, a processing process may be simplified, a code amount may be reduced, and system stability may be improved.

In descriptions of embodiments of the present disclosure, a UAV is taken as an example of movable object. However, the movable object is not limited to a UAV, and other type of movable object may be chosen according to various application scenarios.

Figure 1:
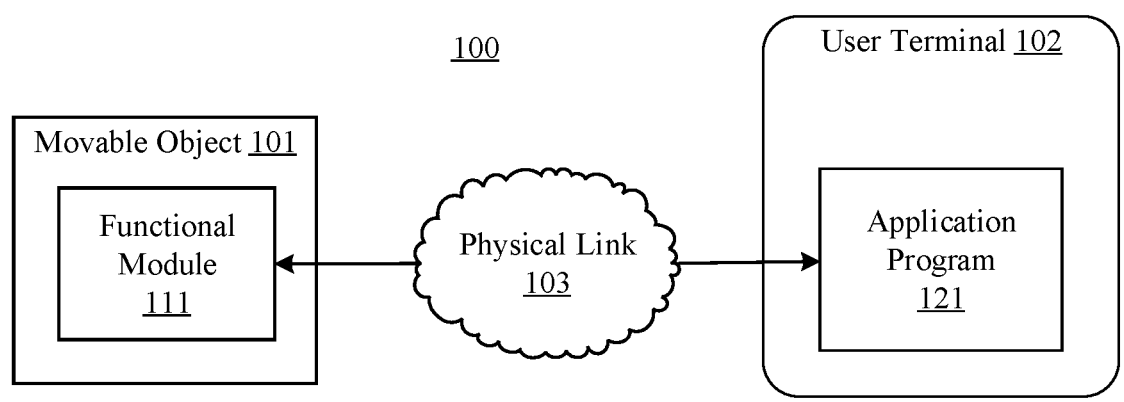
FIG. 1 is a schematic view of an exemplary movable object system consistent with various disclosed embodiments of the present disclosure.

FIG. 1 is a schematic view of an exemplary movable object system 100 consistent with various disclosed embodiments of the present disclosure. As shown in FIG. 1, in the movable object system 100, a user terminal 102 communicates with a movable object 101 through a physical link 103.

In some embodiments, the movable object 101 may include an unmanned vehicle such as a UAV, an autonomous car, or the like, a handheld device, and/or a robot. The user terminal 102 may include a smart phone, a tablet computer, a remote controller, and/or a personal computer.

In some embodiments, the movable object 101 may include a functional module 111. For example, a UAV may include a camera, a battery, a gimbal, a flight controller, a communication circuit, and/or the like.

In some embodiments, the user terminal 102 includes an application program 121. For example, in a UAV system, the application program 121 may control the UAV and loads carried by the UAV through the physical link 103, and may receive data, e.g., audios, videos, images, and/or other multimedia data, from the UAV and/or loads carried by the UAV through the physical link 103.

In some embodiments, the user terminal 102 may include a communication circuit for processing communications between the user terminal 102 and the movable object 101. In some embodiments, the communication circuit may be configured to process communications between the application program 121 in the user terminal 102 and the functional module 111 in the movable object 101. For example, in a UAV system that includes an uplink and a downlink, the uplink may be configured to send a control signal, and the downlink may be configured to send data such as audios, videos, images, and/or other multimedia data.

Figure 2:
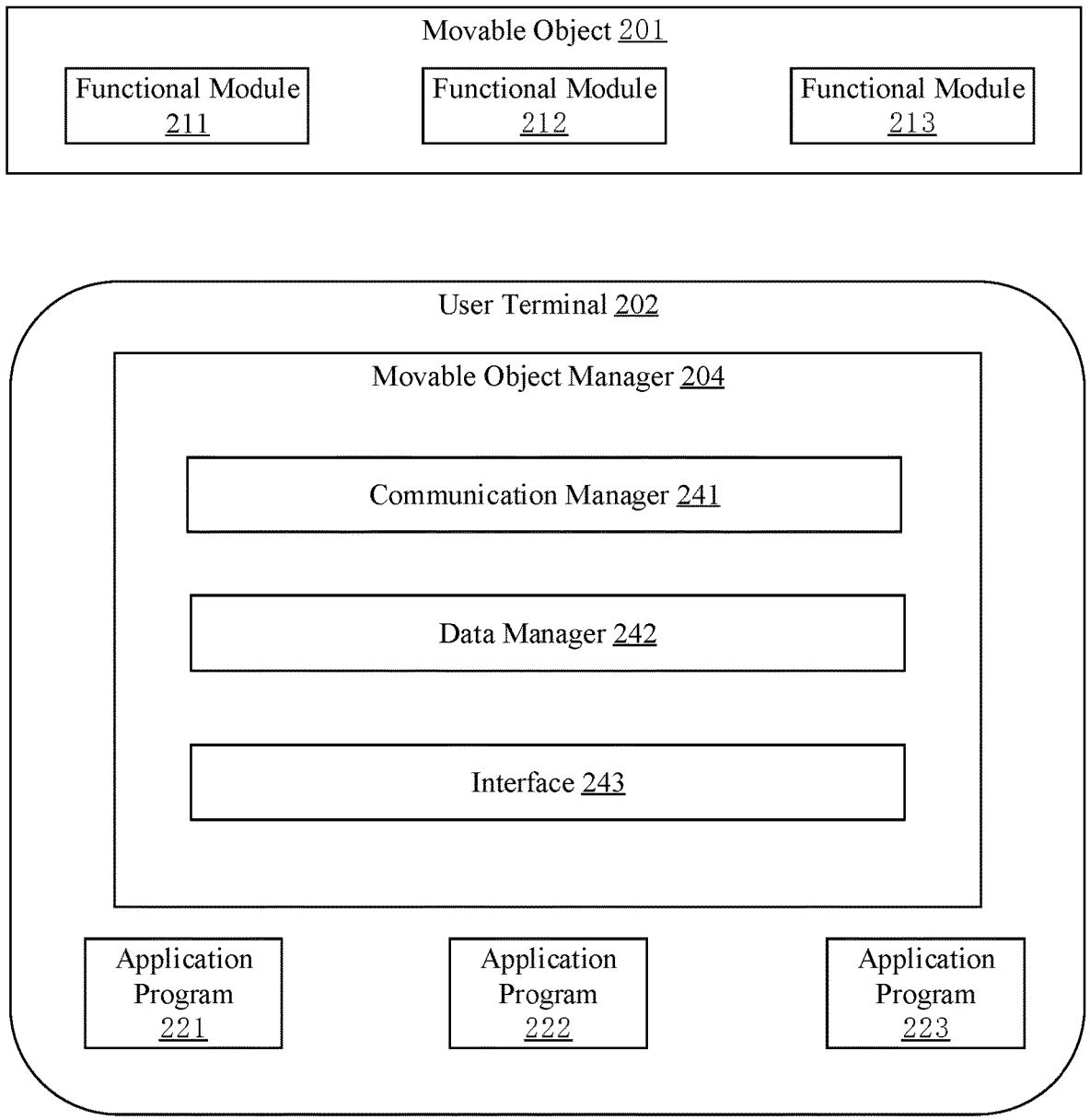
FIG. 2 is a schematic view of an exemplary movable object manager consistent with various disclosed embodiments of the present disclosure.

FIG. 2 is a schematic view of an exemplary movable object manager consistent with various disclosed embodiments of the present disclosure. As shown in FIG. 2, the movable object manager 204 is configured to access and control the movable object 201. In some embodiments, the movable object 201 includes functional modules 211 to 213.

In some embodiments, the movable object managing device 204 and application programs 221 to 223 may be included in the user terminal 202. The application programs 221 to 223 may access and control the movable object 201 and receive data of the movable object 201, e.g., multimedia data such as audios, videos, and/or images, through the movable object manager 204. In some embodiments, the movable object manager 204 may be included in a separate device. In some other embodiments, the movable object manager 204 may be included in the movable object 201.

In some embodiments, the movable object manager 204 may include a communication manager 241, a data manager 242, and an interface 243. The communication manager 241 may be configured to process data related to a communication protocol, establish a communication connection between the application programs 221 to 223 and the movable object 201. The data manager 242 may be configured to manage data interactions between the application programs 221 to 223 and the movable object 201. The interface 243 may be used by the application programs 221 to 223 to access and invoke the movable object manager 204.

Figure 3:
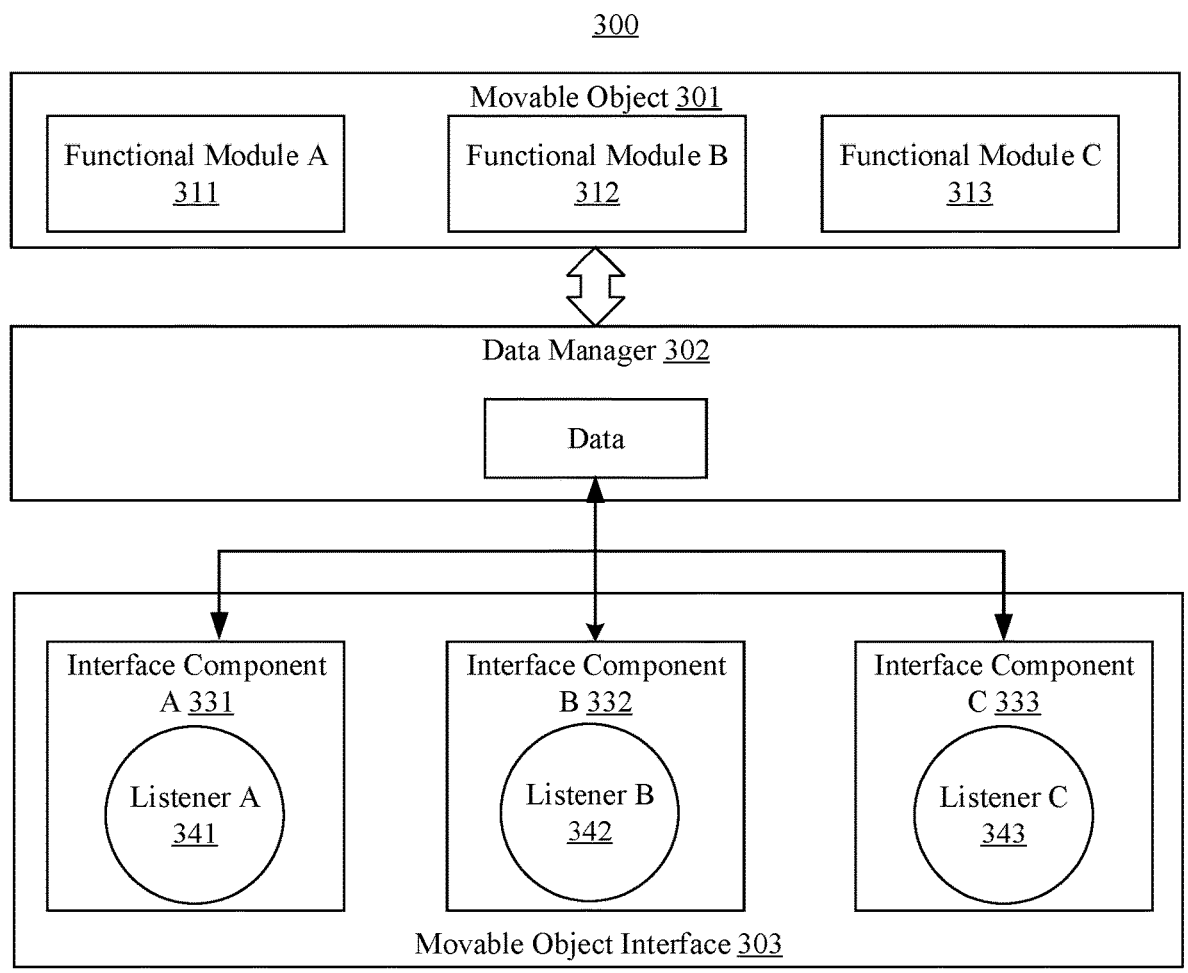
FIG. 3 is a schematic view of an exemplary movable object interface consistent with various disclosed embodiments of the present disclosure.

FIG. 3 is a schematic view of an exemplary movable object interface consistent with various disclosed embodiments of the present disclosure. As shown in FIG. 3, in a software development environment 300, a movable object interface 303 may provide access to a movable object 301, and the software development environment 300 may include, for example, a software development kit (SDK) environment.

The movable object 301 includes, but are not limited to, functional modules A to C, corresponding to reference numerals 311 to 313. The movable object interface 303 includes, but are not limited to, interface components A to C, corresponding to reference numerals 331 to 333. The interface components A to C (331 to 333) of the movable object interface 303 may correspond to the functional modules A to C (311 to 313) in the movable object 301.

The movable object interface 303 may provide one or more callback functions to support a distributed computing model between an application program and the movable object 301.

The application program may invoke a callback function to determine whether the movable object 301 has received a command, or may receive an execution result through a callback function. Thus, although the application program and the movable object 301 may be spatially and logically separated, the application program and the movable object 301 can interact with each other through the callback function.

As shown in FIG. 3, the interface components A to C (331 to 333) are associated with listeners A to C, corresponding to reference numerals 341 to 343. The listeners A to C (341 to 343) may notify the interface components A to C (331 to 333) to use corresponding callback functions to receive information from the associated functional modules.

The data manager 302 may be configured to prepare data for the movable object interface 303. The data manager 302 can decouple and encapsulate related functions of the movable object 301. Further, the data manager 302 can be configured to manage the data exchange between the application program and the movable object 301. Thus, an application program developer may not need to involve in complex data exchange processes.

For example, a DJI SDK can provide a plurality of callback functions for transmitting instance information or receiving execution results from a UAV. For example, the DJI SDK can establish a connection between a UAV and an application program on a smart phone that uses, e.g., an Android system or an iOS system.

Figure 4:
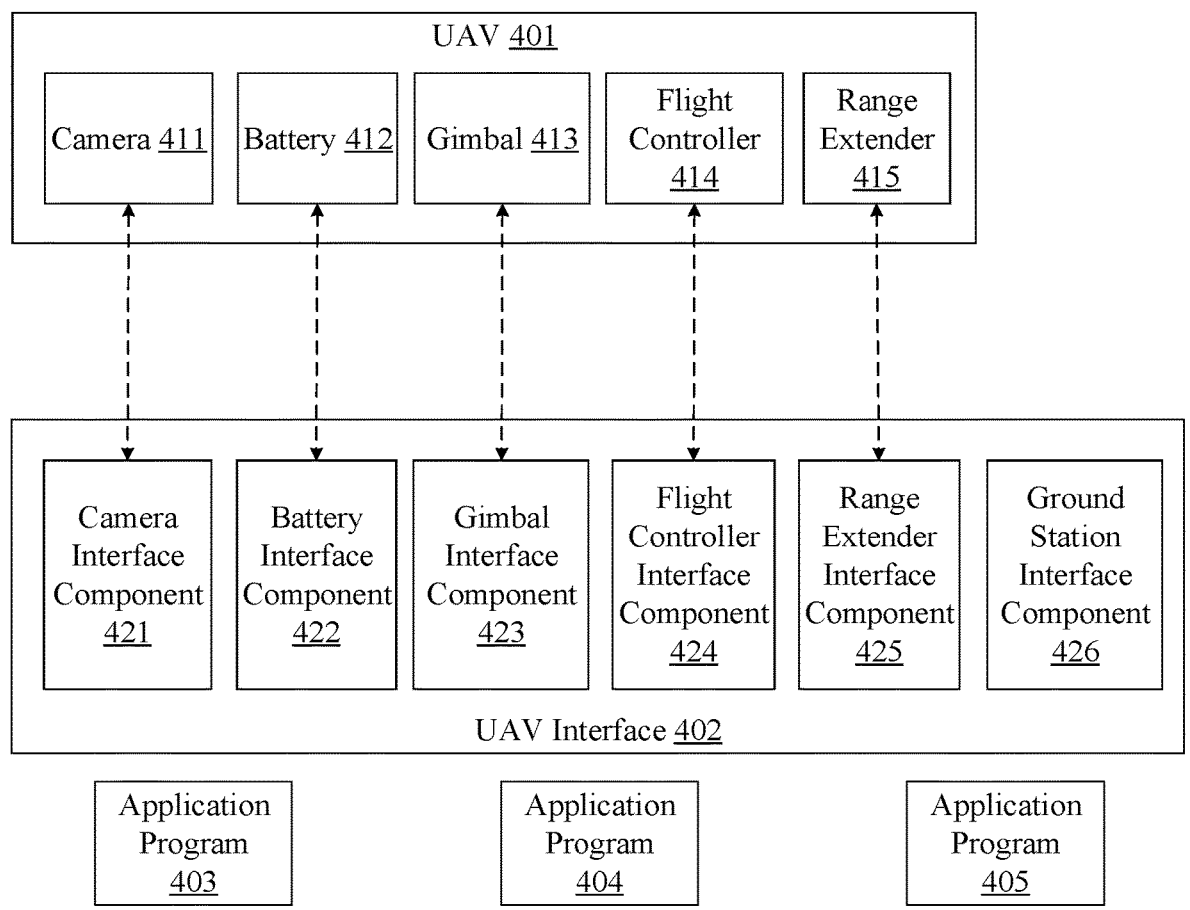
FIG. 4 is a schematic view of an exemplary unmanned aerial vehicle (UAV) interface consistent with various disclosed embodiments of the present disclosure.

FIG. 4 is a schematic view of an exemplary UAV interface consistent with various disclosed embodiments of the present disclosure. As shown in FIG. 4, the UAV interface 402, corresponds to the UAV 401. Application programs 403 to 405 can access and control the UAV 401 by invoking the UAV interface 402.

In some embodiments, the UAV may include a plurality of functional modules, such as a camera 411, a battery 412, a gimbal 413, a flight controller 414, and/or a range extender 415. Correspondingly, the UAV interface 402 includes a camera interface component 421, a battery interface component 422, a gimbal interface component 423, a flight controller interface component 424, and/or a range extender interface component 425. For example, the application program 403 may access and control the camera 411 through the camera interface component 421.

In some embodiments, as shown in FIG. 4, the movable object interface 402 further includes a ground station interface component 426. The ground station interface component may be configured to perform one or more flight control operations that may need relatively high levels of authority.

Figure 5:
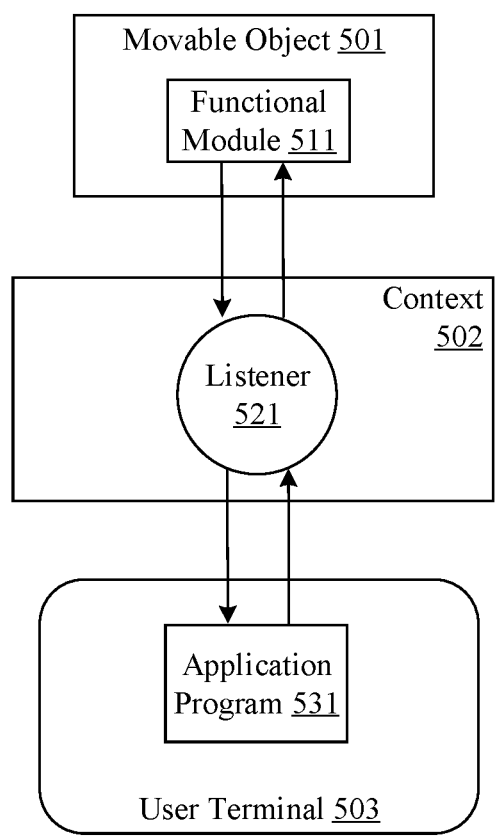
FIG. 5 is a schematic view of an exemplary listening environment consistent with various disclosed embodiments of the present disclosure

FIG. 5 is a schematic view of an exemplary listening environment consistent with various disclosed embodiments of the present disclosure. The listening environment includes a listener 521, which is registered. As shown in FIG. 5, the listener 521 is associated with a functional module 511 in a movable object 501 for listening in change of the functional module 511. When the listener 521 detects a change of the functional module 511, the listener 521 notifies an application program 531 on a user terminal 503. An updated key value may be called back to the application program 531 through a callback method. For example, the DJI SDK can provide a plurality of callback functions for transmitting instance information or receiving execution results from a UAV.

In some embodiments, the listener 521 may be added in a context, e.g., a context 502. In some embodiments, the context may be deployed, e.g., arranged, on the user terminal 503, e.g., on the application program 531. In some embodiments, the context may be deployed on the movable object 501, e.g., on the functional module 511. In some embodiments, the context may be deployed on a third-party device. In the present disclosure, where the context is arranged is not restricted, and may be chosen according to various application scenarios.

Figure 6:
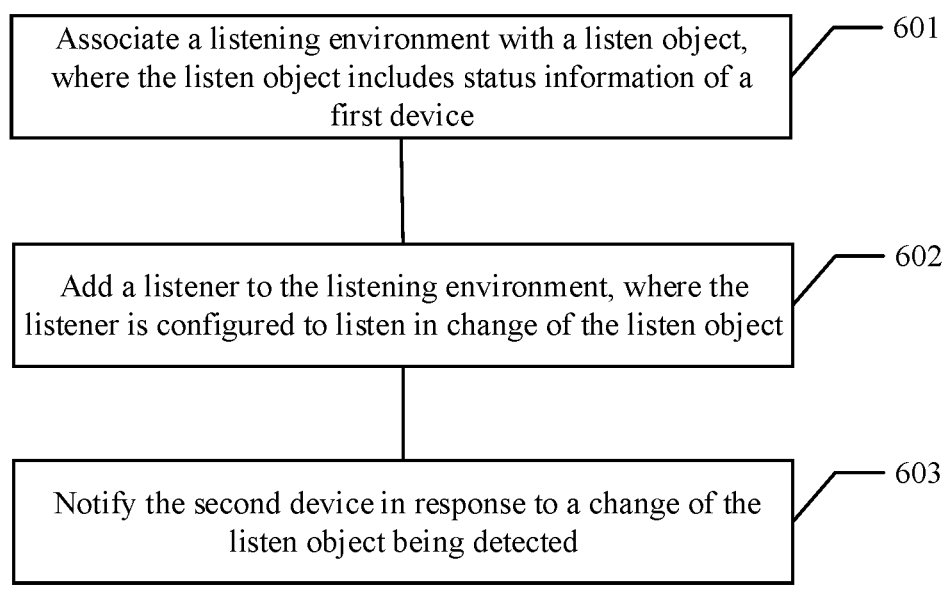
FIG. 6 is a flowchart of an exemplary remote synchronization method consistent with various disclosed embodiments of the present disclosure.

FIG. 6 is a flowchart of an exemplary remote synchronization method consistent with various disclosed embodiments of the present disclosure. With reference to FIG. 6, the method is described below.

At 601, a listening environment is associated with a listen object, where the listen object includes status information of a first device.

In some embodiments, the listening environment may include a context that is used to implement information held by a runtime system during an execution. In some embodiments, the context can be associated with the listen object by a setAssociatedObject approach of the runtime system during execution.

In some embodiments, a first device may be a remote device of a second device, and the first device may be wirelessly connected to the second device.

In some embodiments, a first device and a second device may be connected through a wired connection. For example, the first device and the second device may be connected through a serial port.

In some embodiments, the first device may include at least one of a movable object, a carrier, or a payload.

For example, the movable object may include a UAV, the carrier may include a gimbal with pointing and stabilizing functions, and the payload may include a camera.

In some embodiments, the listen object may include at least one of status information of a UAV, status information of a gimbal, or status information of a camera.

In some embodiments, the status information of the UAV may include at least one of an altitude of the UAV, a position of the UAV, an angle of the UAV, or a speed of the UAV. In some embodiments, status information of a UAV component, i.e., status information of a component of UAV, may include status information of a flight controller. The status information of the gimbal may include an angle of the gimbal. The status information of the camera may include at least one of photosensibility, shutter speed, exposure compensation, or aperture.

At 602, a listener is added to the listening environment, where the listener is configured to listen in changes of the listen object.

In some embodiments, pointer information of the listener and the listen object may be added to the listening environment, and the pointer information may include a weak pointer.

In some embodiments, the listener may be configured to listen in a change of the key value of the listen object.

At 603, in response to a change of the listen object being detected, the second device is notified.

In some embodiments, the second device may include at least one of a ground station, a remote controller, a cell phone, a tablet computer, a personal computer, or a UAV.

In some embodiments, in response to a change of the key value of the listen object being detected, the second device is notified.

In some embodiments, in response to a change in the key value of the listen object caused by a successful writing, or an updating or a reading of the key value in an unlocked status, a notification of key value change is sent to the second device.

Figure 7:
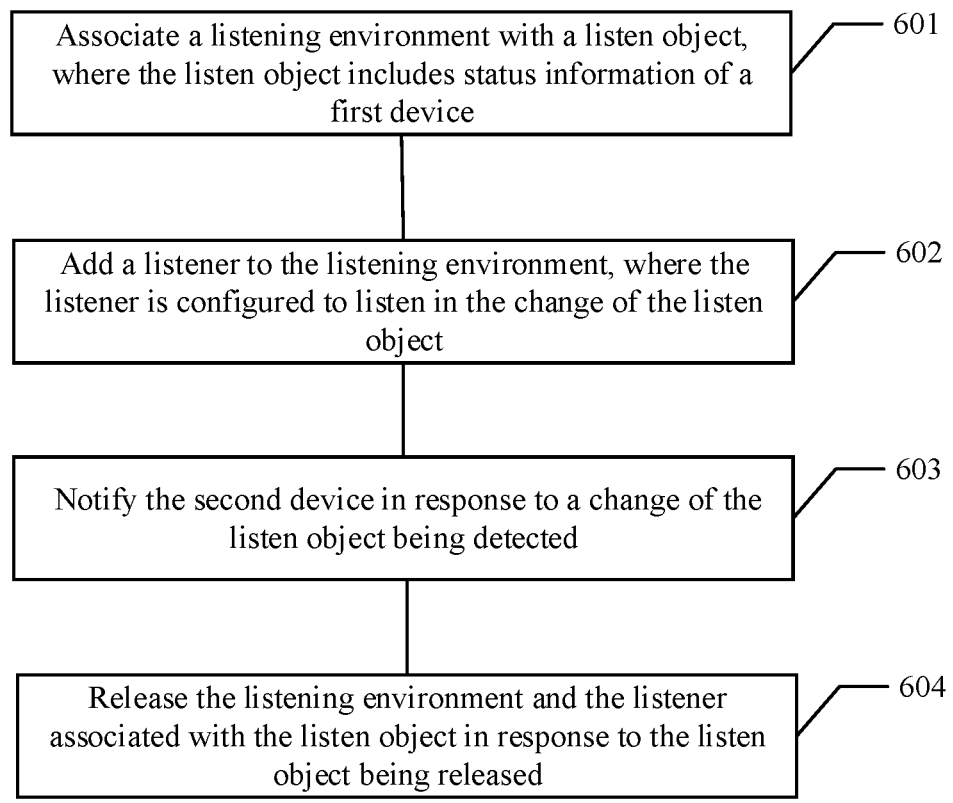
FIG. 7 is a flowchart of another exemplary remote synchronization method consistent with various disclosed embodiments of the present disclosure.

In some embodiments, as shown in FIG. 7, the method further includes releasing the listening environment and the listener associated with the listen object, in response to the listen object being released (process 604).

In some embodiments, in response to the listen object being released, it may be detected that the key value is changed to null, and the listening environment and the listener associated with the listen object may be released.

In some embodiments, the method further includes generating an interface for a custom remote read-write approach, and invoking, e.g., calling, the interface to register the custom remote read-write approach in the listening environment. In response to no listening environment existing when the interface is invoked to register the custom remote read-write approach, a listening environment may be automatically established, and further the custom remote read-write approach may be registered in the listening environment. The custom remote read-write approach may be configured to perform remote read-write operations on the listen object. In some embodiments, the listening environment may include a context.

In some embodiments, the method may further include generating an asynchronous read-write interface. In respond to invoking the asynchronous read-write interface, it is checked whether a custom remote read-write approach is registered.

In response to the custom remote read-write approach being registered, the custom remote read-write approach may be invoked. In some embodiments, the custom remote read-write approach may be invoked to perform remote read-write operations on the listen object. For example, remote read-write operations may be performed on a flight controller.

In response to the custom remote read-write approach being unregistered, a default read-write approach may be invoked. For example, a default key value observation (KVO) interface may be invoked to perform read-write operations on a local device.

In some embodiments, the method may further include generating a writing-start interface and a writing-end interface in the listening environment. In response to the writing-start interface being invoked to start writing to the listen object, a lock status may be added to the listening environment. In response to the writing-end interface being invoked to end writing to the listen object, the lock status may be removed from the listening environment, and information carried when the writing ends may be called back to the invoked asynchronous write approach and the invoked asynchronous read approach. In some embodiments, the listening environment may include a context.

In some embodiments, the method may further include generating a reading-end interface and a key-value-updating interface.

In response to the reading-end interface or the key-value-updating interface being invoked and the listening environment being at a lock status, an operation may not be performed. In response to the reading-end interface or the key-value-updating interface being invoked and the listening environment not being at the lock status, the invoked asynchronous read approach may be called back. In some embodiments, the listening environment may include a context.

For example, in response to the reading-end interface being invoked and the listening environment not being at a lock status, the invoked asynchronous read approach may be called back, and a key value may be passed to the invoker. In response to the key-value-updating interface being invoked and the listening environment not being at a lock status, the invoked asynchronous read approach may be called back, listeners may be notified of the change of the key value.

For simplicity of description, the foregoing method embodiments are described in a plurality of processes. The present disclosure is not limited to the described process sequences. In the present disclosure, certain processes may be performed in other sequences or performed simultaneously. Further, it will be appreciated that the described embodiments are some rather than all of the embodiments of the present disclosure. Some described processes are not necessarily needed by the present disclosure, and may be omitted where appropriate.

In addition to the above-described method embodiments, the present disclosure further provides a remote synchronization apparatus to implement the contents described in the above-described method embodiments.

Figure 8:
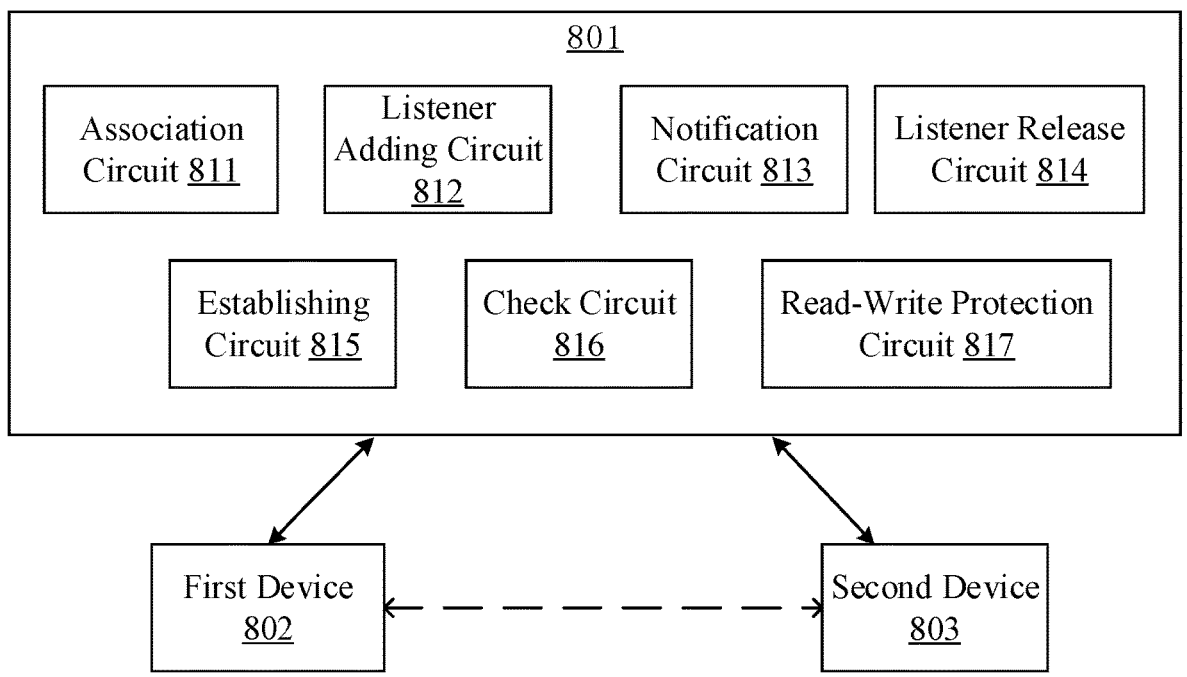
FIG. 8 illustrates a block diagram of an exemplary remote synchronization apparatus consistent with various disclosed embodiments of the present disclosure.

FIG. 8 illustrates a block diagram of an exemplary remote synchronization apparatus 801 consistent with various disclosed embodiments of the present disclosure.

In some embodiments, a first device 802, a second device 803, a connection manner of the first device 802 and the second device 803, and a listen object may be same as or similar to those in the foregoing embodiments of the remote synchronization method.

In some embodiments, the remote synchronization apparatus 801 may be deployed, e.g., arranged, on the first device 802. For example, the remote synchronization apparatus 801 may be coupled to the first device 802 through a serial cable. In some embodiments, the remote synchronization apparatus 801 may be deployed on the second device 803 and wirelessly connected to the first device 802. In some embodiments, the remote synchronization apparatus 801 can be deployed on a third-party device and connected to the first device and/or the second device by wireless or wired connections.

The remote synchronization apparatus 801 includes an association circuit 811, a listener adding circuit 812, and a notification circuit 813. The association circuit 811 is configured to associate a listening environment with a listen object, where the listen object may include, for example, status information of the first device.

In some embodiments, the listening environment may include a context that is used to implement information held by a runtime system during an execution. In some embodiments, the association circuit 811 may associate the context with the listen object by a setAssociatedObject approach of the runtime system during execution.

The listener adding circuit 812 is configured to add a listener to the listening environment, where the listener is configured to listen in change of the listen object.

In some embodiments, the listener adding circuit 812 may be configured to add weak pointers of the listener and the listen object to the listening environment.

In some embodiments, the listener may be configured to listen in change of the key value of the listen object.

The notification circuit 813 is configured to notify the second device 803 in response to a change of the listen object, e.g., a change occurring in the listen object.

In some embodiments, the notification circuit 813 may be configured to notify the second device in response to a change of a key value of the listen object.

In some embodiments, in response to a change in the key value of the listen object caused by a successful writing, or an updating or a reading the key value in an unlocked status, a notification of key value change is sent to the second device 803.

In some embodiments, the remote synchronization apparatus 801 further includes a listener release circuit 814.

The listener release circuit 814 is configured to release the listening environment and the listener associated with the listen object in response to the listen object being released.

In some embodiments, in response to the listen object being released, it may be detected that the key value is changed to null, and the listening environment and the listener associated with the listen object may be released.

In some embodiments, the remote synchronization apparatus 801 further includes an establishing circuit 815 configured to automatically establish, e.g., create, a listening environment, in response to no listening environment existing when a custom remote read-write approach is being registered. The custom remote read-write approach may be configured to perform remote read-write operations on the listen object.

In some embodiments, the remote synchronization apparatus 801 further includes a check circuit 816 configured to check whether the custom remote read-write approach is added. In response to the custom remote read-write approach being added, the custom remote read-write approach may be invoked. In response to the custom remote read-write approach not being added, a default read-write approach may be invoked, such as a default key value conservation (KVO) method.

In some embodiments, the remote synchronization apparatus 801 further includes a read-write protection circuit 817. The read-write protection circuit may be configured to add a lock status to the listening environment in response to a writing-start interface being invoked to start writing to the listen object; and to remove the lock status from the listening environment, and call back information carried when the writing ends to the invoked asynchronous write approach and the invoked asynchronous read approach, in response to a writing-end interface being invoked to end writing to the listen object.

In some embodiments, the read-write protection circuit 817 may be further configured to perform no operation, in response to the reading-end interface or the key-value-updating interface being invoked and the listening environment being at a lock status; and configured to call back the invoked asynchronous approach, such as an asynchronous key value approach, in response to the reading-end interface or the key-value-updating interface being invoked and the listening environment not being at the lock status.

The remote synchronization apparatus embodiments are similar to the above-described method embodiments. For the related details of the remote synchronous apparatus, reference can be made to corresponding descriptions of the method embodiments, e.g., method embodiments described in connection with FIGS. 6 and 7.

The present disclosure provides a remote synchronization apparatus. For synchronizing data and statuses on a remote device to a local device for display and performing operations thereon, it may be needed to consider validity of the data and synchronization mutual exclusion relationships between statuses. In the present disclosure, a processing process for addressing such need may be simplified, a code amount may be reduced, and system stability may be improved.

Figure 9:
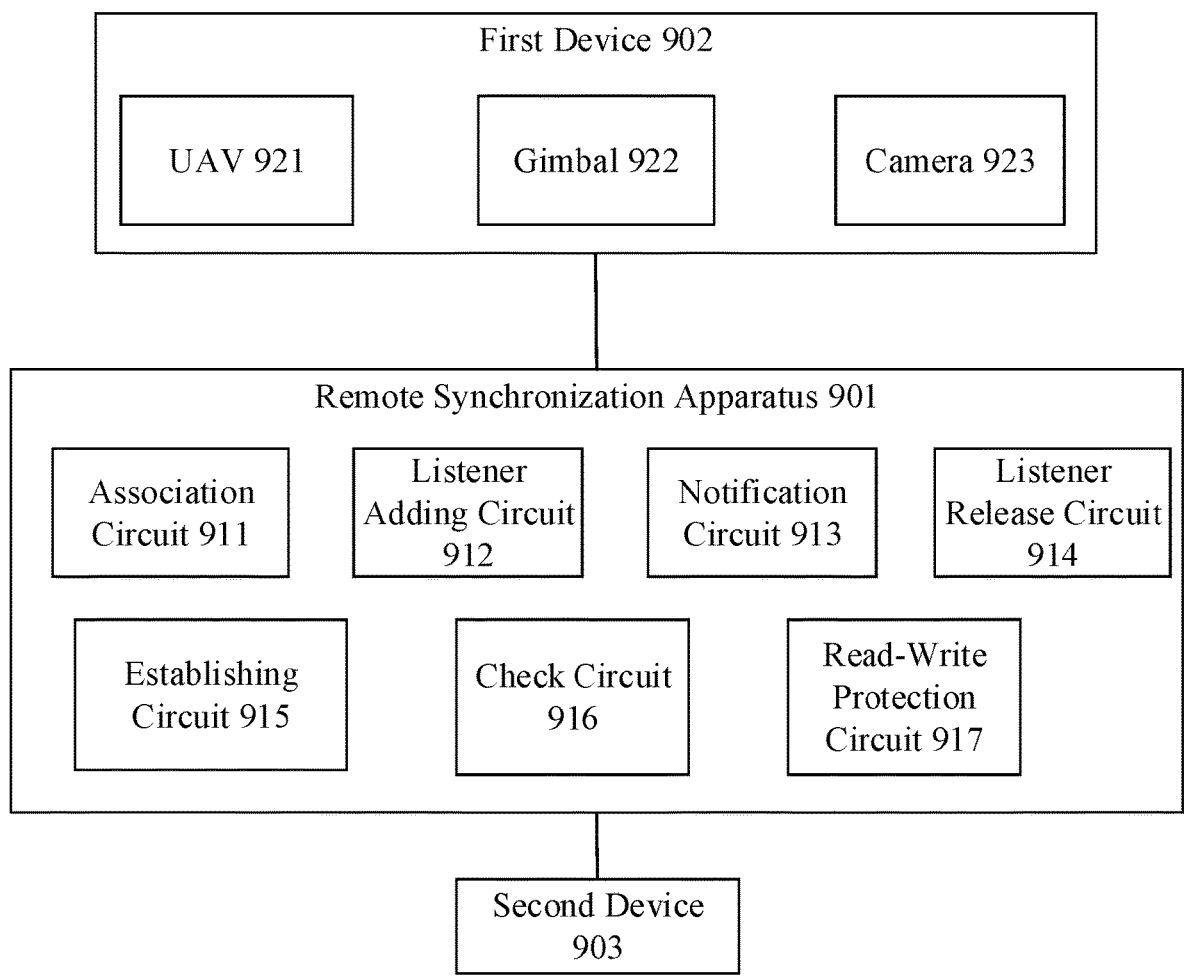
FIG. 9 illustrates a block diagram of an exemplary remote synchronization UAV system consistent with various disclosed embodiments of the present disclosure.

FIG. 9 illustrates a block diagram of an exemplary remote synchronization UAV system consistent with various disclosed embodiments of the present disclosure. As shown in FIG. 9, the remote synchronization UAV system includes a first device 902, a second device 903, and a remote synchronization apparatus 901, e.g., a remote key value synchronization apparatus. The first device 902 includes a UAV 921, a gimbal 922 having pointing and stabilizing functions, and a camera 923. The second device 903 may include at least one of a ground station, a remote controller, a cell phone, a tablet computer, a personal computer, or a UAV.

In some embodiments, the remote synchronization apparatus 901 may be deployed on the first device 902. For example, the remote synchronization apparatus 901 may be coupled to the first device 902 through a serial cable. In some embodiments, the remote synchronization apparatus 901 may be deployed on the second device 903 and wirelessly connected to the first device 902. In some embodiments, the remote synchronization apparatus 901 can be deployed on a third-party device and connected to the first device 902 and the second device 903 by wireless or wired connections.

The remote synchronization apparatus 901 includes an association circuit 911, a listener adding circuit 912, and a notification circuit 913.

The association circuit 911 is configured to associate a listening environment with a listen object, where the listen object may include, for example, status information of the first device. In some embodiments, status information of the first device 902 may include: one or more types of status information of a UAV 921, status information of a UAV component, status information of a gimbal 922, and/or one or more types of status information of a camera 923. In some embodiments, the one or more types of status information of the UAV 921 may include at least one of an altitude of the UAV, a position of the UAV, a speed of the UAV, or an angle of the UAV. In some embodiments, the status information of the UAV component, i.e., status information of a component of UAV, may include status information of flight controller. The status information of gimbal 922 may include an angle of the gimbal. The one or more types of status information of the camera 923 may include at least one of photosensibility, shutter speed, exposure compensation, or aperture.

The listener adding circuit 912 is configured to add a listener to the listening environment, where the listener is configured to listen in a change of the listen object, e.g., listen in a parameter of the UAV 921, a parameter of a component of the UAV 921, a parameter of the gimbal 922, and/or a parameter of the camera 923.

In some embodiments, the listener adding circuit 912 may be configured to add pointer information of the listener and the listen object to the listening environment. In some embodiments, pointer information may include one or more weak pointers.

In some embodiments, the listener may be configured to listen in change of the key value of the listen object, e.g., listen in key value changes of parameters of the UAV 921, the gimbal 922, and/or the camera 923.

The notification circuit 913 is configured to notify the second device 903 in response to a change of the listen object, e.g., a change occurring in the listen object.

In some embodiments, the notification circuit 913 may be configured to notify the second device 903 in response to a change of a key value of the listen object.

In some embodiments, in response to a change in the key value of the listen object caused by a successful writing, or an updating or a reading of the key value in an unlocked status, a notification of key value change is sent to the second device 903.

In some embodiments, the remote synchronization apparatus 901 further includes a listener release circuit 914 configured to release the listening environment and the listener associated with the listen object in response to the listen object being released. In some embodiments, the context and the listener associated with the listen object may be released.

In some embodiments, in response to the listen object being released, it may be detected that the key value is changed to null, and the listening environment and the listener associated with the listen object may be released. In some embodiments, the context and the listener associated with the listen object may be released.

In some embodiments, the remote synchronization apparatus 901 further includes an establishing circuit 915 configured to automatically establish a context in response to no context currently existing when a custom asynchronous read-write approach is being invoked to perform registration. The custom remote read-write approach may be configured to perform remote read-write operations on the listen object.

In some embodiments, the remote synchronization apparatus 901 further includes a check circuit 916 configured to check whether the custom remote read-write approach is added. In response to the custom remote read-write approach being added, the custom remote read-write approach may be invoked. In response to the custom remote read-write approach not being added, a default read-write approach may be invoked, such as a default key value conservation (KVO) approach.

In some embodiments, the remote synchronization apparatus 901 may further include a read-write protection circuit 917 configured to add a lock status to the listening environment in response to a writing-start interface being invoked to start writing to the listen object, and to remove the lock status from the listening environment, and call back information carried when the writing ends to the invoked asynchronous write approach and the invoked asynchronous read approach, in response to a writing-end interface being invoked to end writing to the listen object.

In some embodiments, the read-write protection circuit 917 may be further configured to perform no operation, in response to the reading-end interface or the key-value-updating interface being invoked and the listening environment being at a lock status; and configured to call back the invoked asynchronous approach, such as an asynchronous key value approach, in response to the reading-end interface or the key-value-updating interface being invoked and the listening environment not being at the lock status.

The remote synchronization UAV system embodiments are similar to the above-described method embodiments and apparatus embodiments. For the related details of the remote synchronization UAV system, reference can be made to corresponding descriptions of the method embodiments and the apparatus embodiments, e.g., method embodiments and apparatus embodiments described in connection with FIGS. 6 to 8.

Figure 10:
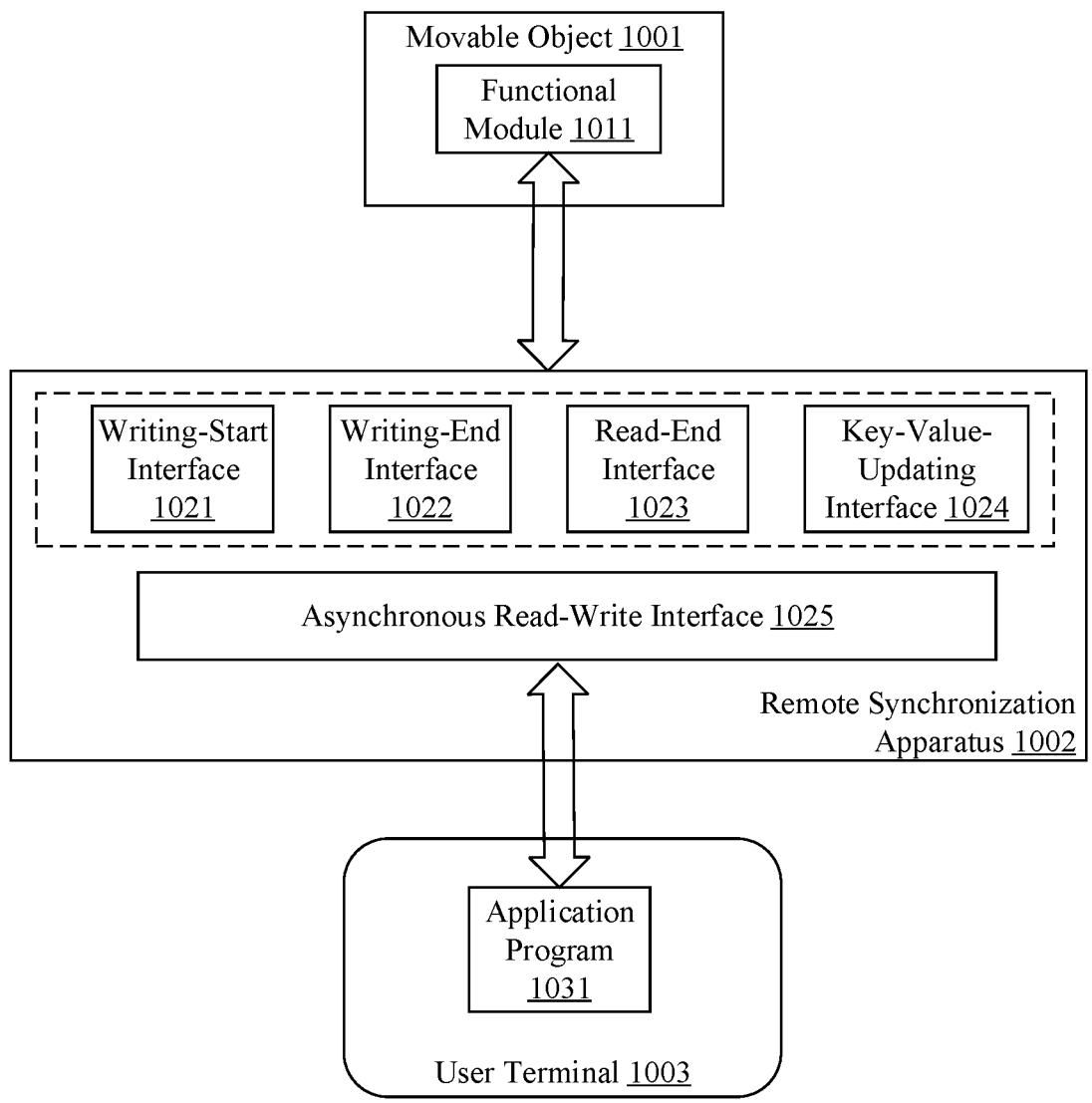
FIG. 10 illustrates a block diagram of another exemplary remote synchronization apparatus consistent with various disclosed embodiments of the present disclosure.

FIG. 10 illustrates a block diagram of an exemplary remote synchronization apparatus consistent with various disclosed embodiments of the present disclosure.

As shown in FIG. 10, an application program 1031 in a user terminal 1003 invokes an asynchronous read-write interface 1025 of a remote synchronization apparatus 1002. The remote synchronization apparatus 1002 invokes a custom remote read-write interface to perform corresponding operations on a functional module 1011 of a movable object 1001, and then receives an operation result and calls back to application program 1031.

As an example, the application program 1031 may set parameters of the functional module 1011. The application program 1031 invokes the asynchronous read-write interface 1025, and the remote synchronization apparatus 1002 invokes a writing-start interface 1021 of the custom remote read-write interface to perform remote writing on the functional module 1011 of the movable object 1001 and to add a lock status to the remote synchronization apparatus 1002 and to send a command. When the setting is completed and the command is responded, the remote synchronization apparatus invokes a writing-end interface 1022 to remove the lock status from the remote synchronization apparatus 1002, and calls back information carried when the writing ends to the application program 1031 through the asynchronous read-write interface 1025.

As another example, the application program 1031 may read parameters of the functional module 1011. The application program 1031 invokes the asynchronous read-write interface 1025, the remote synchronization apparatus 1002 invokes the custom remote read-write approach, and the custom remote read-write approach returns a read result. Further, the remote synchronization apparatus 1002 invokes a reading-end interface 1023, and calls back the read result to the application program 1031 through the asynchronous read-write interface 1025.

As another example, in response to the remote synchronization apparatus 1002 receiving a notification of key value update of the functional module 1011 pushed by the movable object 1001, the remote synchronization apparatus 1002 invokes a key-value-updating interface 1024, and notifies listeners of an updated key value through the asynchronous read-write interface 1025.

The present disclosure provides a remote synchronization apparatus. For synchronizing data and statuses on a remote device to a local device for display and performing operations thereon, it may be needed to consider validity of the data and synchronization mutual exclusion relationships between statuses. In the present disclosure, a processing process for addressing such need may be simplified, a code amount may be reduced, and system stability may be improved.

The present disclosure provides a remote synchronization method, a remote synchronization apparatus and a remote synchronization system. For synchronizing data and statuses on a remote device to a local device for display and performing operations thereon, it may be needed to consider validity of the data and synchronization mutual exclusion relationships between statuses during a data synchronization. In the present disclosure, a processing process for addressing such need may be simplified, a code amount may be reduced, and system stability may be improved.

Embodiments in this disclosure are described in a progressive manner, and descriptions are made with focuses on differences of the embodiments. For same or similar portions, reference can be made to each other among the embodiments.

Those of ordinary skill in the art will appreciate that the exemplary elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

For simplification purposes, detailed descriptions of the operations of exemplary systems, devices, and units may be omitted and references can be made to the descriptions of the exemplary methods.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computing device, such as a processor, a personal computer, a server, or a network device, to perform part or all of a method consistent with the disclosure, such as one of the exemplary methods described above. The storage medium can be any medium that can store program codes, for example, a USB disk, a mobile hard disk, a read-only memory (ROM), a random access memory (RAM), a magnetic disk, or an optical disk. An apparatus consistent with the disclosure may include a processor and a non-transitory computer-readable storage medium, such as a memory, storing instructions that, when executed by the processor, cause the processor to perform a method consistent with the disclosure, such as one of the above-described example methods.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. A remote synchronization method comprising:
   associating a listening environment with a listen object, the listen object including status information of a first device;
   adding a listener to the listening environment, the listener being configured to listen in the listen object;
   notifying a second device in response to the listener detecting that the listen object has changed;
   adding a lock status in the listening environment in response to a writing-start interface is invoked to start writing to the listen object;
   removing the lock status from the listening environment in response to a writing-end interface is invoked to end the writing to the listen object; and
   calling back information carried during ending the writing to an asynchronous write approach and an asynchronous read approach that were invoked.

2. The method of claim 1, wherein the listening environment includes a context configured to implement information held by a runtime system during operation.

3. The method of claim 1, wherein:
   the first device is a remote device of the second device; and
   the first device and the second device are coupled to each other wirelessly.

4. The method of claim 1, wherein:
   the first device includes at least one of an unmanned aerial vehicle (UAV), a gimbal, or a camera;
   the listen object includes at least one of status information of the UAV, status information of a component of the UAV, status information of the gimbal, or status information of the camera;
   the status information of the UAV includes at least one of an altitude, a position, an angle, or a speed of the UAV;
   the status information of the component of the UAV includes status information of a flight controller;
   the status information of the gimbal includes an angle of the gimbal; and
   the status information of the camera includes at least one of photosensibility, shutter speed, exposure compensation, or aperture.

5. The method of claim 1, wherein the second device includes at least one of a ground station, a remote controller, a cell phone, a tablet computer, a personal computer, or an unmanned aerial vehicle.

6. The method of claim 1, wherein adding the listener to the listening environment includes adding pointer information of the listener and the listen object into the listening environment.

7. The method of claim 1, further comprising:
   releasing the listening environment and the listener associated with the listen object in response to detecting that the listen object is released.

8. The method of claim 1, further comprising:
   creating the listening environment in response to a custom remote read-write approach being registered for performing read-write operation to the listen object.

9. A remote synchronization apparatus comprising:
   a processor; and
   a memory storing instructions that, when executed by the processor, cause the processor to:
   associate a listening environment with a listen object, the listen object including status information of a first device;
   add a listener to the listening environment, the listener being configured to listen in the listen object;
   notify a second device in response to the listener detecting that the listen object has changed;
   add a lock status in the listening environment in response to a writing-start interface is invoked to start writing to the listen object;
   remove the lock status from the listening environment in response to a writing-end interface is invoked to end the writing to the listen object; and
   call back information carried during ending the writing to an asynchronous write approach and an asynchronous read approach that were invoked.

10. The apparatus of claim 9, wherein the listening environment includes a context configured to implement information held by a runtime system during operation.

11. The apparatus of claim 9, wherein:
    the first device is a remote device of the second device; and
    the first device and the second device are coupled to each other wirelessly.

12. The apparatus of claim 9, wherein:
    the first device includes at least one of an unmanned aerial vehicle (UAV), a gimbal, or a camera;
    the listen object includes at least one of status information of the UAV, status information of a component of the UAV, status information of the gimbal, or status information of the camera;
    the status information of the UAV includes at least one of an altitude, a position, an angle, or a speed of the UAV;
    the status information of the component of the UAV includes status information of a flight controller;
    the status information of the gimbal includes an angle of the gimbal; and
    the status information of the camera includes at least one of photosensibility, shutter speed, exposure compensation, or aperture.

13. The apparatus of claim 9, wherein the second device includes at least one of a ground station, a remote controller, a cell phone, a tablet computer, a personal computer, or an unmanned aerial vehicle.

14. The apparatus of claim 9, wherein the instructions further cause the processor to add pointer information of the listener and the listen object into the listening environment.

15. The apparatus of claim 9, wherein the instructions further cause the processor to:
    release the listening environment and the listener associated with the listen object in response to detecting that the listen object is released.

16. The apparatus of claim 9, wherein the instructions further cause the processor to:
    create the listening environment in response to a custom remote read-write approach being registered for performing read-write operation to the listen object.

17. A remote synchronization system comprising:
    a first device including at least one of an unmanned aerial vehicle (UAV), a gimbal, or a camera;
    a second device including at least one of a ground station, a remote controller, a cell phone, a tablet computer, a personal computer, or another UAV; and
    a remote synchronization apparatus including:
    a processor; and a memory storing instructions that, when executed by the processor, cause the processor to:
- associate a listening environment with a listen object, the listen object including status information of the first device;
- add a listener to the listening environment, the listener being configured to listen in the listen object;
- notify the second device in response to the listener detecting that the listen object has changed;
- add a lock status in the listening environment in response to a writing-start interface is invoked to start writing to the listen object;
- remove the lock status from the listening environment in response to a writing-end interface is invoked to end the writing to the listen object; and
- call back information carried during ending the writing to an asynchronous write approach and an asynchronous read approach that were invoked.

* * * * *